Oct. 15, 1935.  H. RICCI  2,017,132
SIREN
Filed Jan. 13, 1934
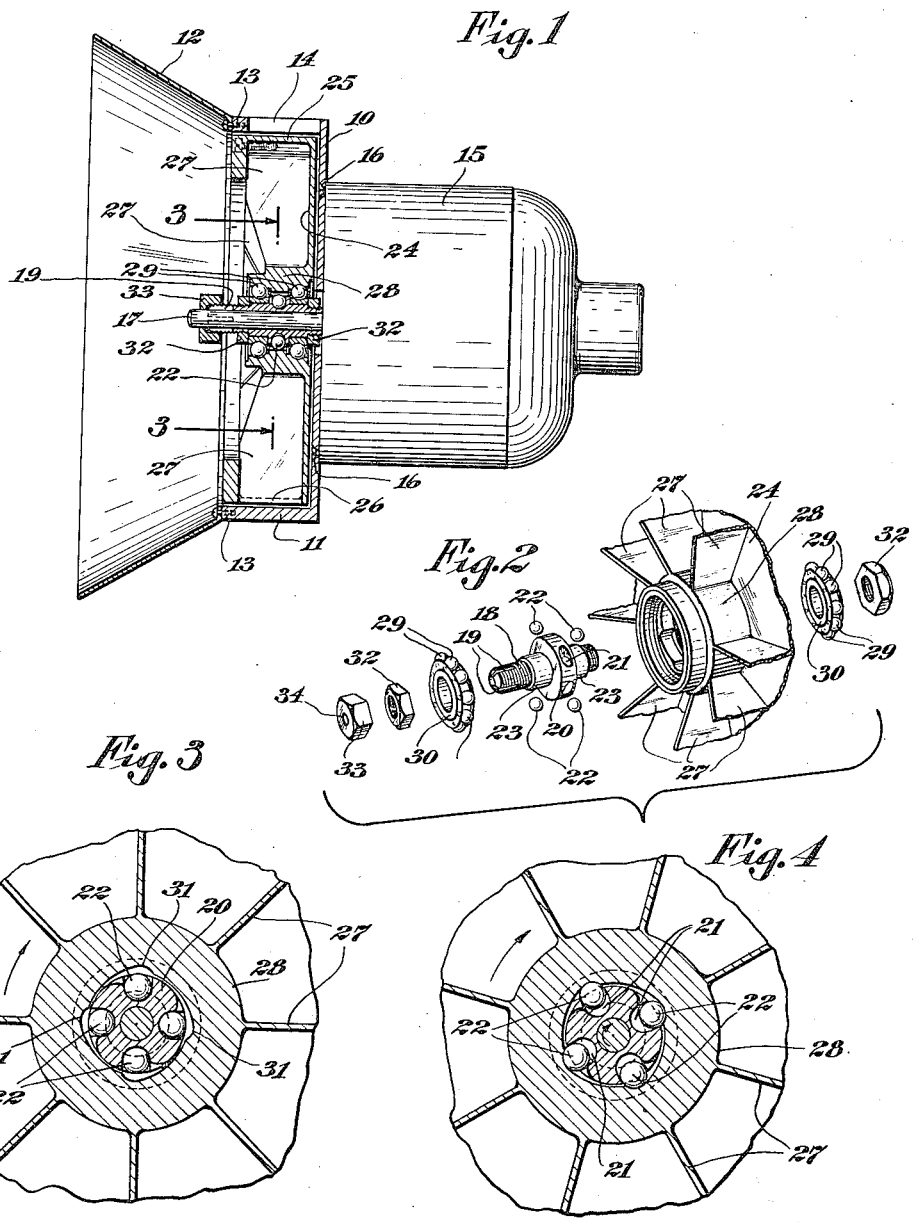
INVENTOR
*Harry Ricci,*
BY *Frederick Breitenfeld*
ATTORNEY Patented Oct. 15, 1935

2,017,132

UNITED STATES PATENT OFFICE 2,017,132

SIREN

Harry Ricci, Staten Island, N. Y., assignor to The Sireno Company, Inc., Staten Island, N. Y., a corporation of New York Application January 13, 1934, Serial No. 706,474

5 Claims. (Cl. 177—7)

My present invention relates generally to signaling devices, and has particular reference to an improved type of siren for use on motor vehicles and the like.

It is a general object of my invention to provide an improved siren device of the character which employs an electric motor as its source of driving power.

A siren of the present general character comprises, essentially, a stator and a rotor, these two elements being so constructed, especially with respect to peripheral outlet openings and vanes, that when the rotor rotates at a relatively rapid rate the characteristic signaling sound is caused to be produced by the passage of air axially into the rotor and thence radially outward through the peripheral openings in the rotor and thence through corresponding openings in the stator. In the employment of this type of siren in a motor vehicle, e. g., a police car or the like, the use of an electric motor for driving the rotor at desired times is of considerable advantage in that the operation of the siren is thus rendered independent of the vehicle motor itself. It is important, however, that a means be provided for permitting the rotor to continue its rotative movements, without impedance, after the current to the electric driving motor has been disconnected. In other words, it is desirable to effect an operation of the siren in a manner whereby the electric motor imparts the initial rapid rotation to the rotor, and whereby the electric motor may then be deenergized while the rotor continues its rapid rotation due to its own inertia and momentum.

The foregoing mode of operation necessarily involves a provision of some sort of clutching arrangement between the electric motor and the rotor of the siren, and it is a particular object of my invention to provide an improved assembly which greatly simplifies the construction, installation, and mode of operation of such a clutching arrangement.

It is a particular feature of my invention to provide a siren device whose assembly involves nothing more than the proper interconnection and mounting of the three essential elements, viz., the stator, the electric motor, and the rotor. More specifically, I provide a means for permanently securing the electric motor to the stator, and I provide a rotor assembly which includes within itself the clutching arrangement hereinbefore referred to. In this way, the rotor assembly, after completion in the factory, may be shipped, handled, sold, and installed as a unit, it being merely necessary to apply the same to the driving spindle of the electric motor and to secure it thereto.

In the preferred embodiment herein illustrated and described by way of example, the rotor assembly consists of a hollow shaft applicable over the motor spindle, a hub which is rotatably mounted on the shaft and which carries the vanes of the rotor, and a free wheeling clutch interposed between the shaft and the hub and forming a part of the permanent rotor assembly. By the term "free wheeling clutch" I intend to refer to any of the conventional or well known types of clutching arrangements, such as the type illustrated in the present drawing, whereby the rotation of a driving member in the driving direction automatically causes a driven member to be engaged whenever the driving member rotates faster than the driven member; the driven member automatically disengaging itself whenever the impetus of the driving member is withdrawn. A typical "free wheeling clutch", as this term is used herein and in the appended claims, is found in the well known type of "coaster brake" on bicycles.

Other objects of my invention lie generally in the provision of a construction which is of improved simplicity, of great compactness, devoid of all unnecessary parts and elements, and extremely easy to install. One of the outstanding advantages of my present construction lies in the ability to replace the electric motor by another in a simple and expeditious manner, in case the original motor requires replacement because of breakdown or otherwise.

I achieve the foregoing objects, and such other objects as may hereinafter appear or be pointed out, in the manner illustratively exemplified in the accompanying drawing, wherein—

Figure 1 is a side view of a siren assembly of the present type, with the rotor and stator shown in cross-section;

Figure 2 is an exploded view of the elements of the rotor assembly;

Figure 3 is an enlarged cross-sectional view taken substantially along the line 3—3 of Figure 1, with the rotor in free wheeling relationship; and Figure 4 is a view similar to Figure 3 showing the rotor and the motor spindle in driving relationship.

The stator I have chosen to illustrate, by way of example, consists of the rear, substantially circular wall 10, the peripheral wall 11, and the forwardly flaring skirt or air-inlet 12. The latter may be secured to the body of the stator by means of studs 13, and may be omitted under certain circumstances since it forms no essential part of the siren construction. The wall 11 is provided with a series of spaced openings or apertures 14 which correspond to similar peripheral openings in the rotor, and which are so constructed and arranged that when the rotor rotates at a sufficiently rapid rate the air expelled radially through the openings 14 will produce the characteristic siren sound. If desired, a screen or network may be placed around the peripheral wall 11 or over the front of the skirt 12, but these refinements of construction form no essential part of the present invention.

Secured to the rear wall 10 is the electric motor 15, the studs 16 being illustrative of one manner of mounting the motor in permanent relationship to the stator. The motor is purposely provided with a projecting driving spindle 17 which projects axially into the stator in the manner shown.

In accordance with my invention, the assembly of the device requires nothing more than the application over the spindle 17 of a unitary rotor device, the several parts of which are shown most clearly in Figure 2.

The rotor assembly consists of the hollow shaft 18 which is externally threaded at its opposite ends and which is longitudinally split, as at 19, at one end. At its midportion, the shaft 18 carries the flange or member 20 which is provided with the radial grooves 21, in each of which a ball or similar rolling member 22 is adapted to be disposed. The nature of the grooves 21 is shown most clearly in Figures 3 and 4, and it will be understood that these grooves, while primarily radial, are nevertheless provided with curved sides of the character illustrated, permitting the balls to position themselves into the relationship of either Figure 3 or Figure 4, depending upon the relative speeds of the shaft 18 and the vanes of the rotor.

On the opposite sides of the member 20 the shaft is provided with the slightly enlarged, unthreaded collar portions 23.

The body of the rotor may be composed of the rear wall 24, the peripheral wall 25 (provided with the openings 26 for the purpose hereinbefore mentioned), and the radial vanes 27. These vanes merge at their inner ends with a hollow hub 28 adapted to be mounted for rotation around the shaft 18. More particularly, the central portion of the inner surface of the hub 28 conforms substantially in diameter with the exterior diameter of the member 20; and the outer portions of the inner surface of the hub 28 are of a size which cause them to ride or roll on the anti-friction bearings 29. The latter are carried on two bearing assembly rings 30 of conventional character which fit loosely over the collar portions 23.

The midportion of the hub is provided also with the spaced recesses 31 whose function will be presently described. The assembly of the rotor involves nothing more than the insertion of the balls 22 into the grooves 21; the arrangement of the hub 28 over the shaft 18 so that the midportion of the hub registers with the member 20; the application of the bearing rings 30; and the application of the securing means, typified by the nuts 32. The latter are adapted to engage over the threads of the opposite ends of the shaft 18, and to bear against the exposed surfaces of the rings 30, respectively, thereby holding all of the parts in unitary assembly, as shown most clearly in Figure 1.

When the device is to be assembled, the unitary rotor construction is slipped over the projecting driving spindle 17, and the nut 33 is then applied over the exposed split end of the shaft 18, thereby squeezing the split portions of the shaft against the spindle 17 and locking the shaft 18 to the spindle 17. Any other convenient means for locking the shaft 18 to the spindle 17 may be employed, if desired, but the nut 33 is an extremely simple expedient which has proven satisfactory in practice. The nut 33 is, of course, provided with the opening 34 in its outer face to permit the spindle 17 to project therethrough when the nut is tightened onto the split end of the shaft.

In operation, the energization of the motor 15 causes the spindle 17 to rotate in the direction of the arrow of Figure 4, viz., in a clockwise direction, as viewed in this figure and in Figure 3. This is the driving direction, and when the spindle 17 rotates in this direction, at a rate faster than the hub 28, the grooves 21 direct the balls 22 outwardly and cause the latter automatically to wedge themselves into the recesses 31, thereby producing a wedged driving relationship between the spindle 17 and the hub 28. This causes the hub 28 and the rotor vanes carried thereby to rotate in the same direction and at the same rate of speed; and when the speed is sufficient the characteristic shriek of the siren makes itself heard. When the motor is deenergized, the hub and the rotor vanes continue to rotate, due to their own momentum; and since this rotation is faster than the driving spindle, the balls 22 are automatically directed inwardly into the grooves 21, as shown in Figure 3 thereby permitting the hub to continue its rotation freely and unimpeded. As the rotor gradually reduces its speed, due to air resistance and friction, the initial shriek of the siren gradually reduces in pitch, thereby producing the characteristic sound. If at any moment the motor spindle is again caused to be a driving force, the balls 22 are again automatically deflected outwardly and enter again into the wedged relationship with the hub, carrying the latter along with the spindle 17 whenever the latter travels faster than the hub.

The foregoing mode of operation is not novel per se, and is characteristic of the well-known type of free wheeling clutch which is herein illustrated by way of example.

While the free wheeling clutch, as such, is known to those skilled in the present art and in many other arts, it will be observed that, in accordance with my present invention, this clutch forms a part of the permanent rotor assembly; and when the rotor is initially manufactured, and the nuts 32 applied to the opposite sides of the shaft 18, the clutching arrangement is not only completely enclosed but is properly assembled in association with the other elements and is hence assured of proper operation at all times. Even the most unskilled mechanic may handle and apply the present rotor assembly, since it is merely necessary to slip the rotor over the spindle 17 and to apply and tighten the locking nut 33.

It is also to be observed that, in the event that the windings of the motor 15 are injured or require replacement, the entire siren need not be rendered idle or unusable during the repairing procedure. It is a relatively simple matter to withdraw the nut 33 and the studs 16 and to replace the entire motor with another motor of similar type, this replacement being also an extremely expeditious proceeding capable of accomplishment by even the most unskilled operator.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In a siren rotor, a hollow shaft, a hub rotatably mounted on said shaft and carrying the rotor vanes, a free wheeling clutch interposed between said shaft and hub, and means securing said elements together in a unitary assembly.

2. A siren rotor comprising a hollow shaft, a hub rotatably mounted on said shaft and carrying the rotor vanes, a free wheeling clutch interposed between said shaft and hub, anti-friction bearings between the shaft and hub to facilitate free rotation of the hub when the hub and shaft are out of driving relationship, and means securing said elements together in a unitary assembly.

3. In a siren rotor, a hollow shaft, a hub rotatably mounted on said shaft and carrying the rotor vanes, a free wheeling clutch interposed between said shaft and hub, anti-friction bearings at opposite ends of the hub and between the shaft and hub to facilitate free rotation of the hub when the hub and shaft are out of driving relationship, and means mounted on the shaft at its opposite ends and engaging said bearings, respectively, for securing said elements together in a unitary assembly.

4. In a siren rotor, a hollow shaft, a hub rotatably mounted on said shaft and carrying the rotor vanes, a free wheeling clutch interposed between said shaft and hub, and means securing said elements together in a unitary assembly, said clutch comprising a radially grooved member secured to said shaft, and rolling members disposed in said grooves and adapted to wedge against said hub when the shaft is rotated faster than the hub in driving direction.

5. A siren comprising a stator, a motor secured thereto and having a driving spindle projecting axially into the stator, and a rotor comprising a hollow shaft applicable over said spindle, a hub rotatably mounted on said shaft and carrying the rotor vanes, anti-friction bearings between said shaft and hub, a free wheeling clutch interposed between the shaft and hub and forming part of the permanent rotor assembly, and means for locking said shaft to said spindle.

HARRY RICCI.